(12) United States Patent
Ward

(10) Patent No.: US 8,082,908 B2
(45) Date of Patent: Dec. 27, 2011

(54) 2-VALVE, 2-PLUG, 2-INTAKE LEAN BURN ENGINE WITH SQUISH FLOW WITH ABOUT 2/3 THE COMBUSTION CHAMBER UNDER THE EXHAUST VALVE

(76) Inventor: Michael A. V. Ward, Arlington, MA (US)

( * ) Notice: Subject to any disclaimer, the term of this patent is extended or adjusted under 35 U.S.C. 154(b) by 509 days.

(21) Appl. No.: 12/319,982

(22) Filed: Jan. 14, 2009

(65) Prior Publication Data
US 2010/0175673 A1  Jul. 15, 2010

Related U.S. Application Data

(60) Provisional application No. 61/011,521, filed on Jan. 18, 2008.

(51) Int. Cl.
*F02D 41/34* (2006.01)
(52) U.S. Cl. .................................................... 123/661
(58) Field of Classification Search .................. 123/661
See application file for complete search history.

(56) References Cited

U.S. PATENT DOCUMENTS 6,267,107 B1 * 7/2001 Ward .............................. 123/661
7,165,528 B2 * 1/2007 Ward .............................. 123/301

* cited by examiner

*Primary Examiner* — Michael Cuff
*Assistant Examiner* — James Kim
(74) *Attorney, Agent, or Firm* — Burns & Levinson LLP; Jerry Cohen

(57) ABSTRACT

An ignition-engine system for internal combustion engines having two-valves per cylinder (100) with a larger intake valve (103) and a smaller exhaust valve (104) in a longitudinal layout with a single camshaft (118) operating bucketed valve stems 103a and 104a that are vertical, with the valves making up essentially the roof of the combustion chamber and having a volume essentially under the intake valve of approximately 35% of the combustion chamber and a volume under the exhaust valve of approximately 65%, and two spark plugs per cylinder with plugs (102a) and (102b) located at the edge of two opposite squish-zones (105) of a compact combustion chamber, wherein the air-flow near TC is channeled between the two large squish-lands (101a) and (101b) wherein the cross-section of the channel is approximately constant of average width "W', resulting in a relatively more compact combustion chamber having squish-lands take up approximately ⅓ of the projected bore area of the cylinder and the more compact channel to be approximately ⅔ of the bore area, wherein as the piston approaches ignition it provides an approximately orthogonal-to-the-main-flow (109) through the action of the squish walls which have a clearance of only about 0.06 inches with the piston at top center for improving knocking by moving the spark-flame kernel toward the hotter exhaust valve.

5 Claims, 2 Drawing Sheets

# 2-VALVE, 2-PLUG, 2-INTAKE LEAN BURN ENGINE WITH SQUISH FLOW WITH ABOUT 2/3 THE COMBUSTION CHAMBER UNDER THE EXHAUST VALVE This application claims priority under USC 119(e) of U.S. provisional application Ser. No. 61/011,521, filed Jan. 18, 2008.

FIELD OF THE INVENTION

This invention relates to a low-cost, two-valve, two-plug, squish-flow combustion chamber, where an internal combustion engine (ICE) is designed to be able to burn lean mixtures for high engine efficiency and low exhaust emissions. The invention also relates, in part, to a 42 volt based high energy coil-per-plug ignition system which is used for the ignition of the two-plugs per cylinder.

BACKGROUND OF THE INVENTION AND PRIOR ART

The invention relates, in part, to squish induced, turbulence generating, colliding mixture flows with two valves and two plugs of high energy spark discharges as disclosed in my U.S. Pat. No. 6,267,107, referred to henceforth as '107; to a two-valve, two-plug, high squish-flow generating IC engine, my U.S. Pat. No. 7,165,528, referred to henceforth as '528; to a Hemi type combustion chamber with two valves and two plugs; to the Fireball combustion chamber located under the exhaust valve with the intake generating squish and consequently swirl, developed by Michael May, I Mech E 1979, and Automotive Engineering, Vol. 84, No. 6; to a paper "Investigation of High-Compression Lean Burn Engine" which studies the May Fireball combustion chamber and shows its advantages, by Oda et al, Mazda Motor Corp.; to a 42 volt based coil-per-plug ignition system as is disclosed in my U.S. Pat. No. 6,142,130, referred to henceforth as '130, providing high energy ignition sparks to the colliding flows for igniting the rapidly moving air-fuel mixture; and including improving the energy density and efficiency of its ignition coils through use of biasing magnets, also disclosed in my U.S. Pat. No. 7,178,513, referred to henceforth as '513.

SUMMARY AND OBJECTS OF THE PRESENT INVENTION

In the case of the present invention, i.e. the Ward/May Lean Burn Engine, or the 2-valve, 2-plug, dual intake squish flow, much more squish is added to the cylinder head, and about ⅔ of the combustion chamber is placed essentially under a horizontally oriented exhaust valve (vertically exhaust valve stem), making a cup-like volume to increase the knock rating and lean burn of the engine, and the remaining approximately ⅓ of the combustion chamber in either a cup-like volume under a horizontal oriented intake valve (vertically intake valve stem), or a slightly sloped, triangular section of the intake valve, where it can promote good breathing and swirl and/or tumble flow, and rapidly burn extremely lean mixtures. The engine features a novel dual intake system which allows a simple, single overhead camshaft system which helps create a radial intake flow to enable a tumble flow, and by having a second intake and throttle on the engine side where the hot exhaust ports and manifold are located and the first intake and throttle on the other side of the engine where the conditions are cooler, then by means of electronic throttle controls, for cold start, for example, the second throttle is more open to supply warmer air to the cylinder for faster warm-up; and for higher power, i.e. the first throttle is more open to give cooler, more dense air to the cylinder. The system uses my dual-plug, unique, high energy ignition systems '130 and '513, and can achieve a fast-burn, lean-burn operation for high engine efficiency and low NOx emissions.

It is a principal object of the invention to design and build a two-valve, two-plug, two-intake, lean burn, fast burn, two-squish-land push-rod or overhead cam valve actuated multi-cylinder engine, but preferably a four cylinder engine with a combustion chamber with a horizontally oriented exhaust valve at the top of a cup-like volume approximately 65% of the combustion chamber volume, and the intake valve having a vertical valve stem (horizontal valve) or an approximately 15° to the vertical valve stem, to promote swirl and/or tumble motion of the air by having a greater air-flow at the central edge of the intake valve which opens up to the cup-like volume under the exhaust valve, i.e. near the "roof" of the chamber, versus at the bottom section adjacent to the cylinder wall. An important improvement is that the intake air is less restricted and is channeled and guided between the two large squish-lands through the cup-like volume under the exhaust valve, defining a cross-section of the channel "W" which is nearly constant (confined by the squish lands). As the piston approaches top center (TC), it provides an intense, essentially orthogonal-to-the-main-flow, i.e. "squish" of air through the plug gaps, resulting in a colliding-turbulent-flow to promote mixing and complete burning of the fuel without impeding the main or primary flow.

It is an aspect of the invention that the large intake and smaller exhaust valve make a large part of the roof of the combustion chamber where the intake valve stem is either vertical or makes approximately 15° to the vertical axis of the engine, and the exhaust valve stem is vertical, and wherein the valves are in a much simpler and less expensive longitudinal direction to a single camshaft where the air intake may be on one side for swirl production, or on both sides of the engine to form a symmetrical, longitudinal intake air-flow to minimize swirl and maximize air-tumble motion when needed. The exhaust port is on one side of the engine cylinder head and is preferably below the air-intake port, so if the intake system is split on the two sides of the engine, the intake manifold does not interfere with the exhaust, which may be below the intake runner. The intake air manifold may be designed to be inside the exhaust manifold, i.e. to form a coaxial structure so that part of the intake air preheated by conduction for rapid warm-up during start-up. The flow is less restricted except for the squish walls of the two guiding channels which have a clearance of about 0.06 inches with the piston at top center, and the large squish lands produce intense squish-flow at about right angles to the dominant or main flow direction at TC, which produces good mixing of the air-fuel charge and produces minimal flow restriction, and the knock rating of the chamber is enhanced due to the 0.06 inches of clearance.

Another aspect of the invention is to have preferably free-wheeling valves with a notch on the intake side of the piston if it is angled, e.g. about 15°. If a horizontal intake valve is used, it will have a cup-like volume of height of about half of the exhaust valve clearance and not have the possibility for a notch. It will be free-wheeling or driven in such a way that it does not matter. If pushrods or other safe means of operating the valves are used, i.e. a timing chain, it may not be necessary to have free-wheeling valves.

Another aspect of the invention is to have a higher compression ratio of, say, 11 to 1 made possible by firing the plugs independently, and having the major part of the combustion chamber under the exhaust valve which increases the knock rating of the engine, and having the squish-land clearance to the piston being about 0.06 inches which increases the knock rating as pointed out by engine developer and race driver Jim Feuling Another aspect of the invention is to have a relatively large bore made possible by the dual spark plugs and squish-flow, i.e. a big-bore four with displacements of 2.0 liters or 3.0 liters, which can have the power of a typical six cylinder engine.

Another aspect of the invention is to have a relatively more compact combustion chamber by having the two squish-lands take up approximately ⅓ of the projected area of the bore and the channeled or guiding section to be approximately ⅔ for the area, making ⅔ of the area representing the more compact chamber.

Another aspect of the invention is to have the intake valve diameter INVD about ½ of the piston bore diameter B and the exhaust valve size EXVD about 0.35 of B.

Another aspect of the invention is to have the roof of the combustion chamber where the intake valve stem makes an angle of approximately 15° to the vertical axis of the engine and the exhaust valve stem is vertical, and wherein the valves are in a longitudinal direction to the single camshaft where the air intake may be on both sides of the engine cylinder head to form a symmetrical, longitudinal, intake air-flow to minimize swirl and maximize air tumble motion, i.e. the intake port is split in two halves at 90° to the intake air direction to the cylinder to help the air intake to be directed along the camshaft in the longitudinal direction and to not interfere with the adjacent cylinder, and that the two intake runners form the multiple intakes, and the runners each meet at the midpoint of the engine and each have a throttle and air-filter means.

Another aspect of the invention is to have a large intake valve and a smaller exhaust valve which make a large part of the "roof" of the combustion chamber where the intake valve is horizontal and has a cup-like volume of approximately ½ of the cup-like volume of the exhaust valve which is also horizontal, and the two plugs are preferably vertical with thin walled tubes surrounding them to prevent oil from the valve train from reaching them, so that the manufacture of the head is particularly simple and has four vertical holes drilled per cylinder (two for the valves and two for the plugs), and wherein the valves are in a longitudinal direction to the camshaft, with the air intake may be on both sides of the engine cylinder head to help form a symmetrical longitudinal intake air-flow to minimize swirl and maximize air-tumble motion. The intake port is split in two halves at 90° to the intake air direction to insure the air intake is along the camshaft-longitudinal direction, and the two intake runners form multiple intakes, and the runners may join up at the middle of the engine, or at one end of the engine and each have a throttle and air-filter means, or one filter means if they meet at one end. The pair of intake runners and throttles are preferably electro-mechanically controlled so that the air-flow through each half can be depended on the intake air temperature, the pressure, and the AFR, among others, to optimize the engine for efficiency, emissions and power.

Another aspect of the invention is to have a pair of high energy density coils per cylinder (one per plug) achieved by the use of biasing magnets to raise the coil energy density up to five times (150 mJ/gm). Novel use of low cost biasing magnets and coil winding structure, including winding with primary turns Np of 70 to 100 turns, and turns ratio Nt of 40 to 60, allows for a short, efficient cylindrical coil with spark energy in the 100 mJ to 180 mJ range, and with secondary peak current of approximately 300 ma.

Another aspect of the invention is to have two plugs located at opposite sides, at the edges of the squish lands, so that the sparks discharges and initial flame kernels move towards the hotter side of the combustion chamber at the exhaust valve due to the squish-flow, and preferably the plugs are located vertically and are of the halo-disk type (my patent '513) which are circular symmetric and have slots in the ground electrode so that air-flow keeps them cool and clean, and the firing of the spark gap that has a relatively lower breakdown voltage than a conventional spark plug.

Another aspect of the invention is to have the firing ends of the plugs be located near the ends of the intersection of the base of the cylinder head and the piston where the squish-flow is more intense during the end of the compression stroke and interacts strongly with the sparks, i.e. so that there is strong coupling between ignition sparks and the squish-flow field, with the 14 mm threaded hole for the plug thread free of the thread for the last about 10 mm.

Another aspect of the invention is to improve the operation of the 2-valve, 2-plug engine, by having the firing time of the two plugs be independent, i.e. the spark gaps and locations of the plugs relative to the squish-flow intensity and swirl differing, and the plugs may be fired at different times so, for example, the plug is fired first which is acted more strongly with swirl and pushes the flame kernel towards the exhaust valve.

Another aspect of the invention is to have a 42 volt power converter, as in my patent '130, with two energy storage capacitors on the output of the converter with output Schottky diode means connected to each capacitor, so that on converter charging the two capacitors are charged equally, and each diode is connected to independent coils with a plug on each secondary winding to operate each plug independently.

Another aspect of the invention is to have the plugs closer to the exhaust valve and the air-flow near TC pushing the spark discharges towards the exhaust valve so the initial flame is at the hotter part of the chamber to increase the engine's knock rating.

As used herein, the term "vertical" with respect to an engine shall mean the direction of the axis of the cylinders with no reference to ground, i.e. the engine is oriented with the connecting rods, located at top center, positioned vertically, with the cylinder head above the connecting rods; and the terms as used herein "approximately" means within ±20% of the term it qualifies; the term "equal to" means±10% of the term it qualifies; and the term "about" means between 0.5 and 2 times the term it qualifies.

Other aspects and objects of the invention will be apparent from the following detailed drawings of preferred embodiments of the invention taken in conjunction with the accompanying drawings, in which:

BRIEF DESCRIPTION OF THE DRAWINGS

In FIG. 4c, the layouts of the valves that are in a transverse direction to the camshaft with the air intake on the left side and the exhaust is on the right, directly across from the intake valve.

DISCLOSURE OF PREFERRED EMBODIMENTS

Figure 1A:
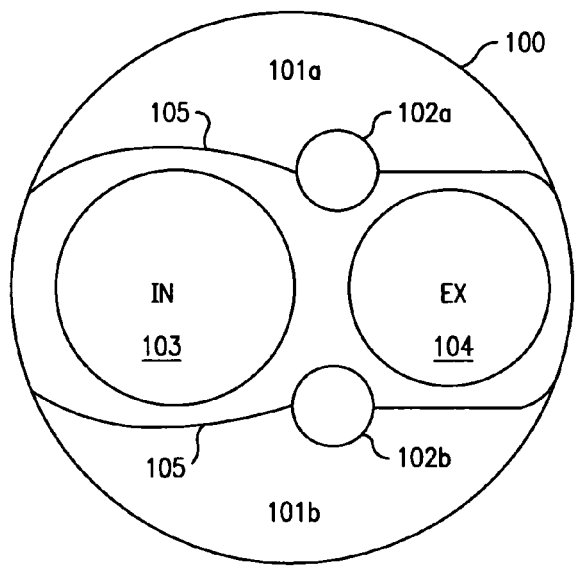
FIGS. 1a, 1b, and 1c are approximately to-scale top view and two side views of a 3.5" bore (B) and 3.0" stroke (S) of an cylinder of an IC engine depicting two squish-lands with two spark plugs at the edge of the squish-zone, and showing an intake and exhaust valve, the exhaust valve being oriented horizontally with a cup-like volume of approximately ⅔ of the combustion chamber, and the intake valve stem makes about 16° angle to the vertical axis and has approximately ⅓ the combustion volume under it.
Figure 1C:
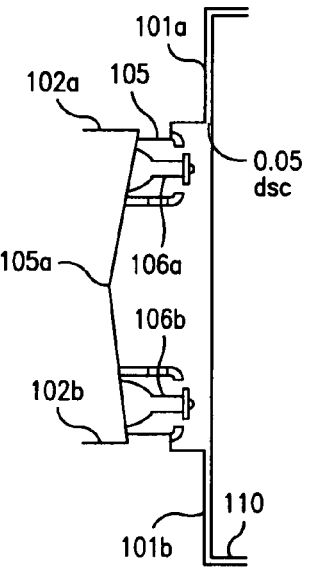
Figure 1B:
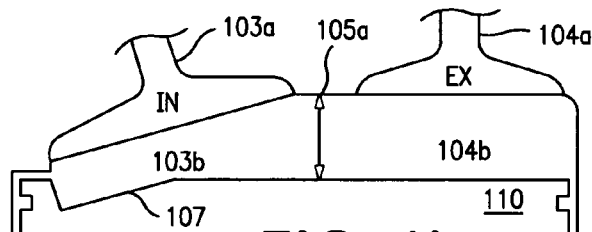

FIGS. 1a, 1b, and 1c are approximately to-scale of a 3.5" bore (B) and 3.0" stroke (S), representative of a 4-cylinder 1.9 liter engine, wherein the cylinder 100 has two large squish-lands 101a and 101b with spark plugs 102a and 102b at the edge of the squish-zones 105, and showing the larger intake valve 103 and exhaust valve 104, and further showing the partial top-view FIG. 1a and two side-views FIG. 1b, 1c of preferred embodiments of a 2-valve engine combustion chamber with dual squish flow lands 101a, 101b, two spark plugs 102a, 102b constituting dual ignition, with the smaller exhaust valve 104 having a cup-like chamber 104b of approximate volume 65% of the entire chamber volume Vtc located under the exhaust valve, and the larger intake valve 103 designating a triangular section 103b of approximate volume 0.35*Vtc (35% the entire combustion chamber volume), the intake valve subtending itself from near the cylinder wall and piston (at TC) to the "roof" for better engine breathing, as shown in FIG. 1b.

Figure 5:
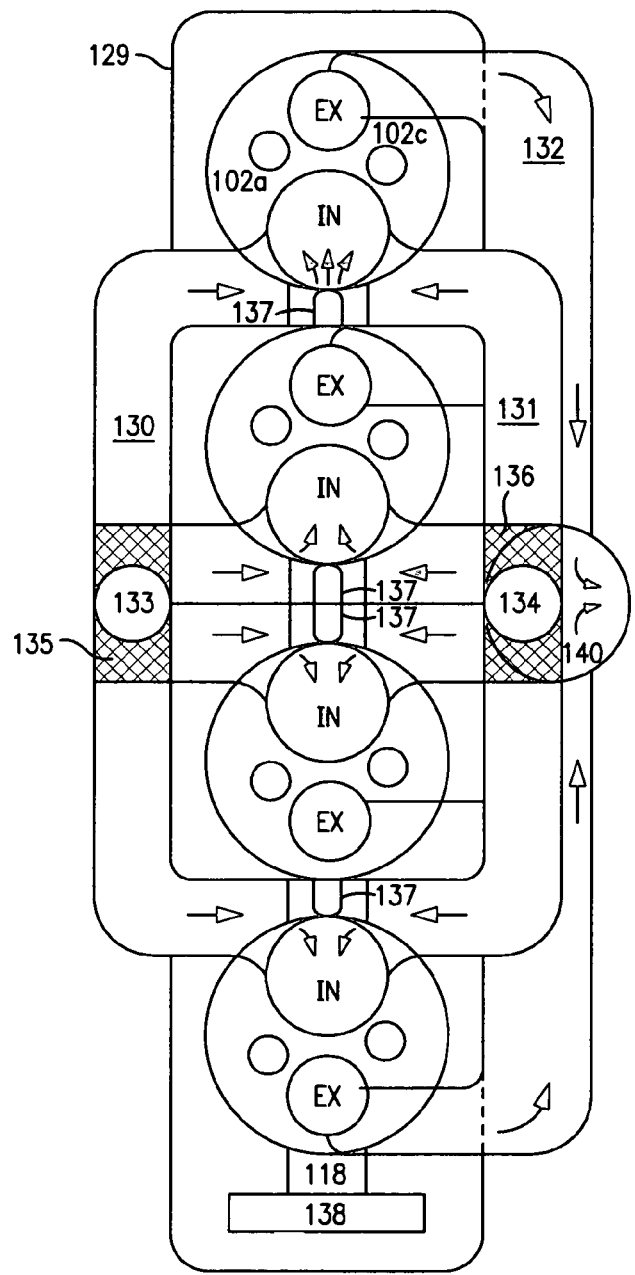
FIG. 5 depicts a preferred embodiment of a half scale, partially schematic top-view of a 4-cylinder engine with valves in a simpler-to-make longitudinal direction to the camshaft, and the valve-stems vertical, with the two plugs oriented vertically, with approximately ⅔ the chamber volume Vtc under the exhaust valve and ⅓ the volume under the intake valve. The air intake is located on both sides of the engine to help form a symmetrical longitudinal intake air-flow to minimize swirl and maximize air-tumble motion under normal, i.e. temperature stable conditions. The exhaust is on one side of the engine, and is preferably below the air-intake to not interfere with the intake runner which is above the exhaust runner.

In FIG. 1b, the large intake valve and smaller exhaust valve make a large part of the chamber "roof", made up of two parts, a triangular "roof" section defined largely by the intake valve 103 where the intake valve stem 103a makes approximately 15° to the vertical axis of the engine, while the exhaust valve stem 104a is vertical and defines the cup-like volume of the combustion chamber underneath the valve, with the air intake is either on one side of the engine or on both sides of the engine as shown in FIG. 5, and the exhaust is on one side of the engine. The intake and exhaust valves stems make an included angle of approximately 15° to the vertical, as shown in FIG. 1b.

As in my patents '107 and '528, the combustion chamber is essentially entirely in the cylinder head with the two spark plugs located at the edges of the squish lands 105 in a line approximately at right angles to the line joining the centers of the two valves 103, 104, to produce high air-flows, approximately orthogonal to the main air flow at the spark plug sites at the time of ignition, for ignition timings near piston TC. The clearance between the piston 110 at TC and the base of the squish-lands 101a/101b is "dsc", preferably about 0.06 inch (to produce intense squish-flow and turbulence near TC). In FIG. 1c, the sparks at the plug tips 106a, 106b are formed to the ground electrodes, preferably with halo-disk type spark plugs, disclosed in my patent '107 and '513. Preferably, the firing ends of the plugs are near the junction of the piston at TC and the edge of the squish-lands, so that the resulting sparks interacts strongly with the orthogonal-squish-flow for good flow-spark coupling and spreading of the initial flame fronts. Also, note that the plugs are closer to the exhaust valve than the intake valve, and the direction of the air-flow, FIG. 3a, is towards the exhaust valve to move the spark kernels and initial flame fronts towards the region of the hotter exhaust valve to increase the knock rating of the engine.

Figure 3A:
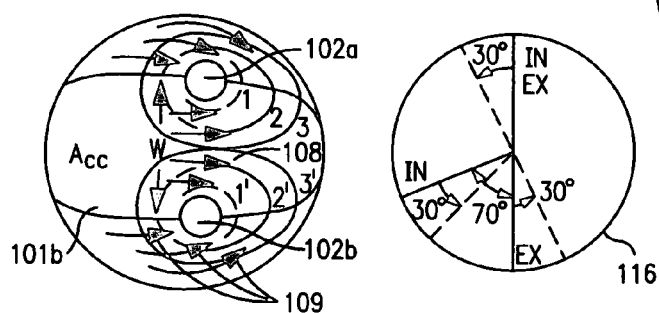
FIG. 3a is a ⅔, partial view of FIG. 1a, showing the air-flow near top center and sequential spark/flame kernels at three times following the start of ignition.

With a view to FIG. 1a, a preferred embodiment is to have a relatively more compact combustion chamber Vtc by having the squish-lands of total squish area Asq (two squish lands) take up approximately ⅓ of the bore area A, i.e. the Asq/A≈⅓, and the channeled or guiding section of width "W" to be approximately ⅔ of the area, i.e. Acc/A≈⅔ (see FIG. 3a for Acc). It turns out that with these dimensions and with a peak of the roof 105a having a height H or "H01" from the piston at TC of approximately 0.54 inch, compression ratio (CR) is equal to 11:1, i.e. between 10:1 to 12:1. While this is for bore size B of 3.5 in, the dimensions scale accordingly for other bore and stroke sizes, noting that Asq/A remain at approximately ⅓, i.e. Asq/A≈⅓. Preferably, this engine can be operated at CR equal to 11 to 1, and higher at light load if variable CR is available.

Using preferred dimensions, we work out an example of a preferred embodiment:

$B=3.5$ in $S=3.0$ in $A=9.62$ sq in $CR=11:1$ $CR=(Vc+Vtc)/Vtc$ $Ho=S/(CR-1)=0.30$ in $Vc=9.62*3.0=28.9$ ci $Vtc=9.62*0.30=2.89$ ci where Ho or ho and Vtc is the height and volume of the rectangular combustion chamber at TC of a simple, disc shaped chamber, and where ci is in cubic inches.

$Asq/A=0.33$ $Acc=(1-0.33)*9.6=6.4$ sq in $h1=2.89/6.4=0.45$ in where Acc is the cross-sectional area of the compact chamber bounded by the squish lands 101a, 101b, and h1 is the clearance height of the piston at TC to the total compact combustion chamber height (left when the squish lands are subtracted out).

Correcting for a clearance height 0.06 in, i.e. "dsc", between the piston at TC and the bottom of the head, i.e. see FIG. 1c, 101a and 101b, the base of the head made up of the two squish-lands representing the bottom of the head.

$Vtco=0.06*9.6=0.58$ ci $Vtc1=2.89-0.58=2.3$ ci $h2=h1*Vtc1/Vtc=0.45*2.3/2.89=0.36$ in where Vtco is the volume associated with "dsc", as shown in FIG. 1c, and Vtc1 is the adjusted volume so that Vtco+Vtc1=Vtc so that the same CR is preserved, i.e. 11:1.

For a triangular/cupped shaped "roof" of the combustion chamber instead of a rectangular shaped chamber and assuming the intake valve triangular portion extends to approximately mid-way of the combustion chamber and joins the horizontally oriented exhaust valve with approximately ⅔ the combustion volume located in a cup-like, then the peak of the "roof" can be shown is approximately 1.33 times the height h2, i.e.

$$h22 \approx 1.33 * h2 = 0.48''$$

Therefore, the total height H10, or H, from the piston located at TC to the peak of the combustion chamber H10 is equal to:

$$H10 = h22 + dsc = 0.48'' + 0.06'' = 0.54''$$

The angle Θ is the angle which the intake valve makes with the piston face and is given by:

$$\sin \Theta = h22/[1/2 * B] = 0.48''/1.75'' = 0.275$$

$$\Theta = 16°$$

The combustion chamber for an 11 to 1 CR is made up of three parts: first is the increased height from 0.30" to 0.45" due to the squish lands; second is the gap dsc of the complete piston area A which reduces the height from 0.45" to 0.36"; and the third region of height h22 of the triangular/cupped shape which increases the height to 4/3*0.36", or 0.48". As expected, they add up to a volume equal to Vtc (2.89 ci). Note that the intake valve is about ¼" from the wall of the cylinder, which leaves room to place a notch 107 on the piston to accommodate the motion of the intake valve (FIG. 1b) so that it may be free-wheeling, if necessary. If it is not necessary for to valve to be free-wheeling, then the valve may extend to the cylinder wall as shown in FIGS. 2a, 2b.

In the case of FIGS. 1a and 1c, the coils used with the spark plugs 102a, 102b can be separate coils for more flexibility of ignition firing and timing, i.e. the plugs can be fired independently or simultaneously. For the present dual output coils, the total coil stored energy may be higher than 200 mJ to make available a minimum of over 100 mJ to each plug, more easily achievable in a compact design coil using biasing magnets (which reduce the requirements for the core area by approximately 40%).

Figure 2A:
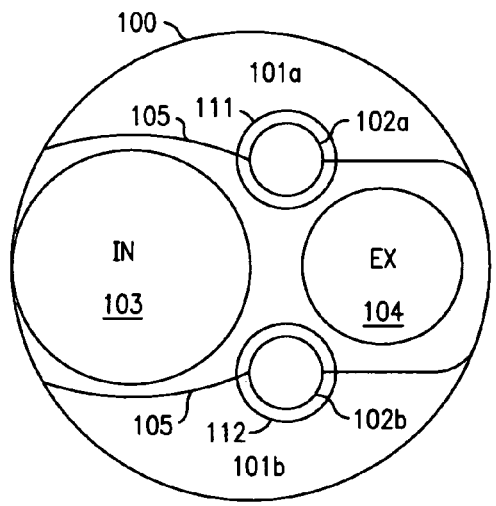
FIGS. 2a and 2b are similar to FIGS. 1a and 1b, except that the intake valve is horizontal with approximately ⅓ of the combustion chamber volume is under it.
Figure 2B:
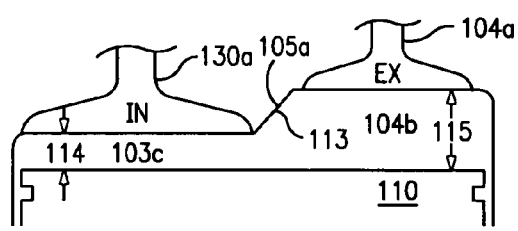

FIGS. 2a and 2b are similar to FIGS. 1a and 1b but 85% of full scale, and the intake valve is horizontal instead of being angled approximately 15°, as in FIG. 1b, and extends from the cylinder wall to the mid point of the cylinder (its diameter is equal to ½*B). Also, it has approximately 35% of the combustion chamber volume 103c under the intake valve, i.e. its height from the piston at TC is approximately ½ of the height of the exhaust valve. Like numerals refer to like parts with respect to FIGS. 1a and 1b.

With respect to FIG. 2a, note the positions of the plugs 102a and 102b are each equal to ¾ inch from the center and equal to 2.0 inches from the left side, so they are closer to the exhaust valve (equal to 1.5 inches from the right side). These are full scale dimensions. Also, the plugs have tubes 111 and 112 around them for not interfering with the oil in the cylinder head, so that the plugs can be positioned vertically in the head, i.e. the two valve holes and the two spark plug holes are all vertical, making an especially easy-to-manufacture cylinder head, especially when the cylinder head is longitudinal with the single camshaft, shown in FIG. 5.

With respect to FIG. 2b, note that the section joining the "roof" of the cylinder head between the intake valve and the section containing the exhaust valve 113 is a smooth transition which will aid in the essentially horizontal air-flow when the intake valve just opens, which can become more naturally a tumble type flow, reinforcing the so called "main flow" in the channel between the squish-lands, so at ignition timing the mixture-flow can move towards the hotter exhaust valve. The minimum height from the piston 110 to the intake valve 103 for this size chamber is approximately 0.3 inches (114), and is approximately 0.55 inches (115) from the piston to the exhaust valve 104. Typical valve openings are approximately 0.3 inches for the intake valve (free-wheeling) and the same for the exhaust valve (equal to ½ of the exhaust valve radius).

FIG. 3a is a ½ scale drawing of FIG. 1a at approximately TC, showing the flow vectors of the main or primary flow 108 in the channel which is confined by the two large squish-lands whose cross-section is approximately constant, defined by the squish lands 101a and 101b, with a maximum "roof" height H. Like numerals refer to like parts with respect to FIG. 1a. As the piston approaches TC at the time of ignition, an intense, approximately orthogonal-to-the-main-flow, colliding-turbulent-flow is produced with flow-vectors designated by 109 to promote good mixing and more complete burning of the fuel in a more compact chamber of area Acc, without significantly impeding the primary flow-rate 108, i.e. the channeled high flow-rate and power. The spark and flame kernels, numbered 1, 2, 3, 1', 2', 3', are shown moving more readily towards the hotter exhaust valve, as preferred.

Figure 3B:
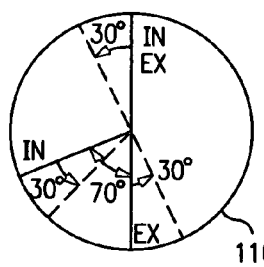
FIG. 3b shows a preferred valve timing of a VVT with 70° intake closing after bottom center (ABC) at light load, and other engine operation, the intake valve timing set to about 40° ABC.

FIG. 3b shows a preferred valve timing circle 116 for a variable valve timing (VVT) system with 70° intake closing after bottom center (ABC) at light loads under lean burn conditions at moderate to high RPM, to give lower intake pumping loss and higher turbulence for faster flame speed because of the later intake valve closing. At a higher load condition and low RPM, the camshaft is shown with a lower 30° rotation, i.e. an advancement of valve timing of the VVT to slow the flame speed to reduce engine harshness, i.e. the intake closing at 40° ABC. The timing diagram shows an intake opening at TC for the 70° closure, and an exhaust valve closure at TC for exhaust valve opening at approximately BC. Note that by valve opening or closure implies about 0.005 inches of the valve action, e.g. intake valve opening and exhaust valve closure occurring at TC is taken to be an actual small valve overlap. While a small phase shift of the VVT actuation is shown, it can also have an amplitude change as is being done by more complex VVT mechanisms, as is known to those versed in the art and technology.

Figure 3C:
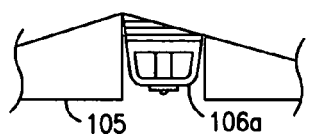
FIG. 3c is a partial view of the preferred halo-disc plug in the head.

FIG. 3c is a partial, expanded view of one of the plugs in the head. The firing end of the plug 106a is seen to be just above the edge of the squish land 105, and about 6 to 12 mm of the thread end of the plug having a larger diameter hole so that the squish-flow can discharge behind the plug end to allow the spark discharge to move in a more central direction and towards the hotter exhaust valve to limit engine knock.

Figure 4A:
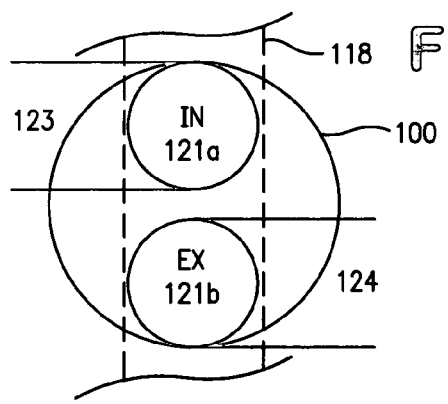
FIGS. 4a, 4b and 4c showing three, not to scale drawings of cylinders, with intake and exhaust valves, with FIG. 4a and 4b depicting the layouts of the valves that are in a longitudinal direction to the camshaft, with the air intake on the left side and the exhaust either on the right (FIG. 4a) or on the left side (FIG. 4b).
Figure 4B:
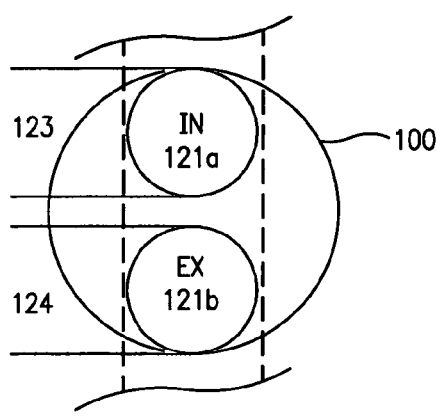
Figure 4C:
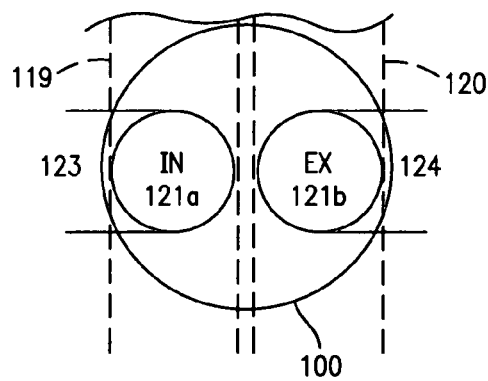

FIGS. 4a, 4b and 4c showing three, not to scale drawings of cylinders 100, with intake valves 121a and exhaust valves 121b, with FIG. 4a and 4b depicting the layouts of the valves that are in a longitudinal direction to the camshaft 118, with the air intake on the left side and the exhaust either on the right (FIG. 4a) or on the left side (FIG. 4b). In FIG. 4c, the layouts of the valves that are in a transverse direction to the dual camshafts 119 and 120, with the air intake on the left side and the exhaust is on the right, directly across from the intake valve.

In all three figures, the intake port is designated as 123 and the exhaust port is designated as 124. In FIG. 4a the intake and exhaust are on opposite sides, while in FIG. 4b they are on the same side. In FIG. 4c, the intake and exhaust ports are directly across from each other, and can have a double overhead cam (DOHC) 119, 120 as is indicated. A single overhead cam (SOHC) with rockers can be used, but if different cams are to be conveniently used on the camshaft, the valve have to be angled, i.e. offset from each other, so that the ends of the valves are along different lengths of the camshaft.

To restate, the valves can be operated by either a single overhead cam 118 in the simplified longitudinal layout (l-layout) shown in FIGS. 4a and 4b, or by a double overhead cam 119/120 in a transverse layout (t-layout) shown in FIG. 4c. It turns out that the l-layout is much simpler of the two types of layouts, but the t-layout is much more useful in using designs which give leaner burn, better efficiency and better WOT power. There is an advantage to using a hybridized scheme where the simpler-to-manufacture l-layout is used with vertical valve stems and vertical plugs, and a novel, symmetrical intake air-flow is made possible by having two intake ports used to each cylinder. This way, the two intake air-flows can be combined to give a radial air-flow directed towards the center of the cylinder for easy tumble generation versus swirl; and where one of the two intakes dominate, the system can be designed to accommodate the resulting air-flow.

In particular, FIG. 5 depicts a preferred embodiment of an approximately half scale, partially schematic top-view of a 4-cylinder engine with valves in a simpler-to-manufacture longitudinal direction to the camshaft 118, and the valves are also oriented with valves stems vertically as in FIG. 2b, and with preferably the two plugs also oriented vertically shown in FIGS. 2a, 2b, with approximately 65% the chamber volume Vtc under the exhaust valve and approximately 35% the volume under the intake valve. However, if the valves are used as in FIGS. 1a, 1b, where the intake valve is angled at, say 15°, then the camshaft must have intake cams which have surfaces which are cut 15° to the axis of the camshaft so the cam, and the translating followers (buckets), are normal to each other and the longitudinal force is small. It is important that the camshaft have no longitudinal play.

In the layout of FIG. 5, the intake valve is taken as in FIG. 2a, 2b. The air intakes 130 and 131 are located on both sides of the engine to help form a symmetrical longitudinal intake air-flow to minimize air-swirl and maximize air-tumble motion. The exhaust 132 is on one side of the engine (shown on the right), and is preferably below the air-intake 131 so as to not interfere with it. Preferably, each pair of intakes on each sides of the engine block connect to each intake valve by having machined through the engine head and connect to the port of the intake valve where the fuel injectors 137 are located (four in total), which would be particularly easy to do. Note that since there are two intake manifolds per cylinder, then the intake dimensions may be smaller than normal.

The position of the intake and exhaust can be placed in any order that is convenient, and in this case is in the order EX, IN, EX, IN, IN, EX, IN, EX. The two intakes runners 130 and 131 are shown to be approximately 0.6 of the length of the engine 129, with two throttles 133 and 134 are on the intake runners, and air-filters 135 and 136 are on the ends of the intake runners, as shown. The throttles are preferably electro-mechanically operated so that they can be independently operated. In this way, they can be adjusted to be balanced, i.e. so that equal air-flows through the two throttles. Or for cold start, the throttle 133 can be shut and 134 opened since the intake runner 131 is above the exhaust 132, and can be designed to get heated more rapidly by the exhaust. In this condition, there will be swirl induced in the combustion chamber, and it may be advantageous to fire the plug on the left first, which will move the spark discharge kernel towards the exhaust valve. The independence of the intake runners provides greater flexibility and accuracy, including having them linked to each other for greater accuracy. The belt or chain connected to the camshaft pulley 138 are not shown, but are known to those versed in the art, especially for VVT mechanisms. Note that 140 is the exhaust system, which may include a pre-catalyst for faster light-off.

The spark plugs shown in FIG. 5 are not symmetrically placed as in FIG. 1a and in FIG. 2a. Viewing the top most cylinder, the left most plug, called the first plug, is seen to be the plug in the same position as plug 102a of FIGS. 1a and 2a. Hence, it is a plug located near the exhaust valve. On the other hand, the other plug, is placed nearer to the intake valve versus the exhaust valve. There are two reasons for this.

The second plug is near the exhaust opening directed from the cylinder, and therefore needs clearance so that the exhaust outlet 132 and the plug do not interfere with each other. The other reason is that if the engine temperature is high and the intake air temperature is also high, the intake runner 130 may be allowed to dominate the intake air-flow which is at a lower temperature. At high load and at WOT, the cool air-throttle 133 may be wide open and the warm air-throttle mostly closed for higher power since the cold air has a higher density than warm air, and gives higher power. In this case also, since the flame speed may be too great because there is less dilution at high loads, it may be desirable to fire only one of the two plugs. That is, there may be engine harshness due to the exceptional speed of the burn. It may be desirable to fire only the second plug. All these features would be relatively easy to incorporate with electro-mechanical throttles and independent electronic plug firing.

There are many advantages to the present system which could be more optimally done by developing electronics controls, such as a speed-density map for fuel control, expect that this would be an air-intake control for the dual intakes. For example, one could have a leanness control which would sense the AFR, temperature, pressure, manifold pressure, RPM, etc, and would supply disporportionally more air from the second, warm throttle since under very lean mixtures conditions having a higher inlet air temperature results in lower HC emissions and better fuel efficiency. In fact, under very lean and low load conditions, the pumping or throttling loss may be reduced by using the second, warm throttle and manifold, where there is good conductive heat transfer between the exhaust gases and the intake manifold to introduce the warmer intake air into the cylinder. The hydrocarbon (HC) emissions are reduced by the hotter gas under very lean conditions, and the engine efficiency is raised by being able to operate leaner for lower pumping losses and without increasing the HC, i.e. without increasing the level of unburned fuel. These are examples of useful mapped points usable in a dual intake controller that will be more fully developed in order to more optimally use the 2-2-2 engine system, i.e. the 2-valve, 2-plug, 2-intake engine system.

Figure 6:
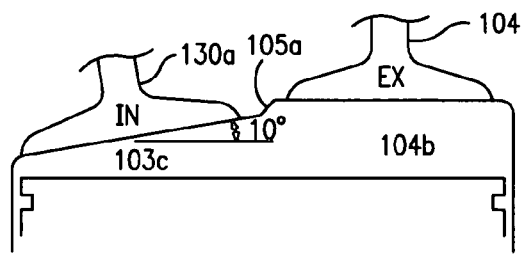
FIG. 6 is a compromise of FIG. 1b and FIG. 2b where the angle made by the valve stem is about 10°.

FIG. 6 is a compromise between FIG. 1b and 2b where the angle made by the valve stem to the vertical of the intake valve is less that of FIG. 1b, i.e. less than 16°, e.g. 10°. Like numerals refer to like parts with respect to FIGS. 1b and 2b. The intake valve makes a smaller angle than given in FIG. 1b, thus placing less force on a cam in the longitudinal direction when operating, and taking less longitudinal space on the engine. Its main advantage, it gives greater degrees of freedom when needed.

As a complete system, there are other advantages and features which may improve the operation of the engine system, as given below.

As far as the exhaust runner 132 of FIG. 5, it is advantageous to make it of stainless steel (SS) since SS has a lower thermal conductivity K, it does not corrode at high temperatures, and can be made thinner for lightness. The intake runner 131, on the same side as the exhaust runner 132, may be made of an aluminum or copper alloy for its high thermal conductivity K, so that it can more effectively heat-up during engine start-up for heating the intake air for better efficiency and lower HC and CO emissions. One can get a more intimate connection between the intake 131 and exhaust 132 by having the intake tubes (the runners) 131 be inside the exhaust runner, coaxially, 132 for more rapid heating of the intake runners (tubes) and of the intake air during cold-start.

If the engine temperature is high and the intake air is also at a high temperature, the intake runner 130 may be allowed to dominate the intake air-flow which is at a lower temperature. It can be made of a high temperature plastic of low K and light weight. At high load and at WOT, the cool air-throttle 133 may be wide open and the warm air-throttle mostly closed for higher power. In this case, since the burning may be too fast because at high loads, i.e. above approximately 65% load, there is low exhaust dilution, i.e. at 15 to 1 AFR and EGR, then it may be desirable to fire only one of the two plugs. All these features would be relatively easy to incorporate with electro-mechanical throttles and independent electronic plug firing. Switching from homogeneous lean burn, e.g. 26 to 1 AFR, at light load, to stoichiometric AFR plus EGR at heavy load, is well known by people who are acquainted with the state of the art.

It may be doubly useful to use an Integrated-Starter-Generator (ISG) with a 42 volt supply, i.e. three 14 volt batteries in series, since the CEI ignition also uses 42 volts which the ignition develops by a 14 to 42 volt DC-DC converter, which would not now be need. For the batteries, new low-cost, light-weight, lead-acid batteries with four times the energy per pound, made by Firefly Energy Inc., of Peoria, could be used.

For an optimized engine, my patent which issued on Jan. 15, 2008 with U.S. Pat. No. 7,318,397, which uses springs in the pistons to achieve Variable Compression Ratio (VCR), i.e. 10:1 to 13:1, may use only two disk spring per piston, because the engine's tolerance for high compression without knocking may be higher, e.g. 11.5:1, so with two springs the VCR may be 11.5:1 to 13.5:1.

The intake controller 134 and air-filter 136 may be replaced by one intake controller and two (or more) intake filters located along the intake runners 131 so that all the intake-air pre-heating can be more evenly divided, for more evenly dividing of the pre-heating of the intake air, and more rapid pre-heating of the colder intake air, e.g. during cold-start.

The intake-air pre-heating can have preferably any number of essentially coaxial sections with the intake air on the inside and the exhaust on the outside or located in opposite sense, as needed i.e. intake air on the outside and exhaust on the inside, to provide the necessary pre-heating of the colder intake air by the hot exhaust gases.

The plugs will preferably be high capacitance plugs (of about 40 picoFarads or greater) attached to coils of energy of approximately 100 mJ or greater.

The plugs will preferably be capacitive plugs with circularly symmetric firing ends, as shown in my patent '513.

The plugs will preferably be slim line plugs with ⅝" hex or 9/16" hex and with 14 mm or 12 mm thread.

The main purpose of the intake pre-heating is to shorten, i.e. to minimize, the time for the engine to reach warm-up, where ideally it can operate at stoichiometry, i.e. 14.7 AFR for gasoline for 3-way catalyst operation, to minimize emissions, and whereby the engine is able to jump to ultra-lean AFR, e.g. from 15 to e.g. 25 AFR, for best efficiency and low NOx emissions, in the shortest time, for example, to give the most efficient engine operation. Ideally, the air intake is from the hot side for rapid heating of the charge, the flame and engine cylinder and where the two plugs are fired for more rapid flame propagation and better heating of the cylinder and engine, and the shortest time transition to stoichiometry and ultra-lean AFR operation.

Since certain changes may be made in the above apparatus and method, without departing from the scope of the invention herein disclosed, it is intended that all matter contained in the above description, or shown in the accompanying drawings, shall be interpreted in an illustrative and not limiting sense.

What is claimed is:

1. A variable air-fuel ratio (AFR), lean burn internal combustion (IC) engine system for igniting, combusting, and expanding a burnt air-fuel mixture and producing work comprising:
   a movable piston within a cylinder that has a cylinder head with single intake and single exhaust valve openings with the combustion chamber located mainly in the head, and wherein the exhaust valve stem is vertical (with the exhaust valve horizontal) and has approximately 65% of the combustion chamber volume in a cup-like volume essentially under the exhaust valve comprising part of the roof of the combustion chamber, and the intake valve comprises an element subtending from the roof to near the intersection of the cylinder wall and the piston at top center (TC) to make a triangular shape, and further including two squish lands for producing high squish-flow and turbulence as the piston nears TC on the engine compression stroke, the system constructed and arranged to have two spark plugs positioned and oriented such that as the piston approaches top center, intense air-flow passes through or near the spark gaps to move and spread the spark towards the cup-like region under the hotter exhaust valve, and further comprising means for improving the lean burn capability of the engine under light load conditions and the knock rating under high loads wherein at least two spark plugs have flexibility relative to each other in terms of ignition firing and timing.

2. The system of claim 1 wherein the intake valve is larger than the exhaust valve and the two valves make essentially the roof of the combustion chamber, wherein the air-flow in the engine cylinder is of low restriction but is channeled and guided between the two large squish-lands which define a relatively more compact combustion chamber by having the two squish-lands take up approximately ⅓ of the projected area of the bore, and the channeled, or guiding section, to be approximately ⅔ for the area representing the more compact chamber.

3. The system of claim 1 wherein the intake valve stem makes about 10° to the vertical axis of the engine with the exhaust valve stem is vertical, with the air intake is on both sides of the engine and the exhaust is on one side of the engine, so that the intake flow is less restricted except for the walls of the guiding channels near TC which have a clearance of only about 0.06 inches with the piston at top center (TC), and the large squish lands produce intense squish-flow at approximately right angles to the dominant or main flow direction which produces good mixing of the air-fuel charge but produces minimal flow restriction of the main flow, and the knock rating of the chamber is improved due to the 0.06 inches of clearance.

4. The system of claim 1 wherein the spark plugs are halo-disk type which have circular symmetric firing ends and have slots in the ground electrode so that air-flows to keep them cool and clean, and the plugs are nearer to the exhaust valve than the intake valve and are directed more so in the direction of the hotter exhaust valve to increase the knock rating of the engine.

5. A variable air-fuel ratio (AFR), lean burn internal combustion (IC) engine system for igniting, combusting, and expanding a burnt air-fuel mixture and producing work comprising:

a movable piston within a cylinder that has a cylinder head with single intake and single exhaust valve openings with the combustion chamber located mainly in the head, and wherein the exhaust valve stem is vertical and the exhaust valve is horizontal and has an approximately 65% of the combustion chamber in a cup-like volume essentially under the exhaust valve comprising part of the roof of the combustion chamber, and the intake valve stem is vertical and the intake valve is horizontal and has an approximately 35% of the combustion chamber in a cup-like volume essentially under the intake valve, and further including two major squish lands for producing high squish-flow and turbulence as the piston nears TC on the engine compression stroke, the system constructed and arranged to have two spark plugs placed in a vertical position and oriented such that as the piston approaches top center, intense air-flow passes through or near the spark gaps to move and spread the spark towards the cup-like region under the hotter exhaust valve, and further comprising means for improving the lean burn capability of the engine under light load conditions and the knock rating under high loads wherein at least two spark plugs have flexibility relative to each other in terms of ignition firing and timing, wherein the air-flow in the engine cylinder is channeled and guided between the two large squish-lands which define a relatively more compact combustion chamber, and the cross-section of the channel "W" is approximately constant confined by the squish lands, so as the piston approaches TC and ignition, it provides an intense, approximately orthogonal-to-the-main-flow with colliding-turbulent-flows to promote good mixing and complete burning of fuel without significantly impeding the main or primary flow-rate.

* * * * *